US012591426B2

(12) United States Patent
Nomura et al.

(10) Patent No.: US 12,591,426 B2
(45) Date of Patent: Mar. 31, 2026

(54) CONTROL DEVICE AND CONTROL SYSTEM

(71) Applicant: HITACHI ASTEMO, LTD., Hitachinaka (JP)

(72) Inventors: Teruaki Nomura, Tokyo (JP); Nobuyoshi Morita, Tokyo (JP); Masashi Yano, Tokyo (JP); Mikio Kataoka, Tokyo (JP); Yasuhiro Fujii, Tokyo (JP); Shuhei Kaneko, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 185 days.

(21) Appl. No.: 18/549,670

(22) PCT Filed: Mar. 1, 2022

(86) PCT No.: PCT/JP2022/008675
§ 371 (c)(1),
(2) Date: Sep. 8, 2023

(87) PCT Pub. No.: WO2022/219948
PCT Pub. Date: Oct. 20, 2022

(65) Prior Publication Data
US 2024/0160433 A1 May 16, 2024

(30) Foreign Application Priority Data
Apr. 14, 2021 (JP) ................................. 2021-068551

(51) Int. Cl.
*G06F 9/44* (2018.01)
*G06F 8/654* (2018.01)
*G06F 21/64* (2013.01)

(52) U.S. Cl.
CPC .............. *G06F 8/654* (2018.02); *G06F 21/64* (2013.01)

(58) Field of Classification Search
CPC ............. G06F 21/53; G06F 2221/2107; G06F 16/2228; G06F 16/9014; G06F 2212/2022; G06F 3/0484; G06F 16/51
See application file for complete search history.

(56) References Cited

U.S. PATENT DOCUMENTS

2007/0212016 A1 9/2007 Kurisu et al.
2018/0131765 A1* 5/2018 Puleston ................. G11C 11/00
(Continued)

FOREIGN PATENT DOCUMENTS

JP      H11-96082 A      4/1999
JP      2004-326689 A      11/2004
(Continued)

OTHER PUBLICATIONS

International Search Report with English Translation and Written Opinion of International Patent Application No. PCT/JP2022/008675 dated May 24, 2022 (11 pages).

*Primary Examiner* — Chuck O Kendall
(74) *Attorney, Agent, or Firm* — Foley & Lardner LLP

(57) ABSTRACT

An object is to shorten a time required for reprogramming of a control device including a single-bank microcomputer. An ECU 901 is a control device including a first microcomputer 1 and a second microcomputer 2 that execute a program stored in a rewriting area 13 in which a memory bank is configured as a single bank. The second microcomputer 2 includes a preprocessing unit 214 that performs preprocessing on a rewriting program 5 in reprogramming processing of rewriting the program stored in the rewriting area 13 into the rewriting program 5, and a transmission unit 213 that transmits the preprocessed rewriting program 5 to the first microcomputer 1. The first microcomputer 1 includes a
(Continued)

reception unit 121 that receives the rewriting program 5 transmitted from the second microcomputer 2, and a writing unit 122 that writes the received rewriting program 5 in the rewriting area 13.

7 Claims, 6 Drawing Sheets

(56)                    References Cited

U.S. PATENT DOCUMENTS

| | | |
|---|---|---|
| 2020/0285458 A1 | 9/2020 | Matsuda et al. |
| 2021/0173634 A1* | 6/2021 | Nakahara ................ G06F 8/658 |
| 2024/0020386 A1* | 1/2024 | Morita ................... G06F 21/64 |

FOREIGN PATENT DOCUMENTS

| | | |
|---|---|---|
| JP | 2007-230317 A | 9/2007 |
| JP | 2020-144682 A | 9/2020 |

* cited by examiner

CONTROL DEVICE AND CONTROL SYSTEM

TECHNICAL FIELD

The present invention relates to a control device and a control system.

BACKGROUND ART

A microcontroller (also referred to as a "microcomputer" below) is used in an electronic control unit (also referred to as an "ECU" below) mounted in a vehicle. In an ECU, software reprogramming is performed in the market in order to add a function to software stored in a non-volatile storage device such as a flash memory provided in a microcomputer, to fix a bug, or the like.

As one method of reprogramming, there is a method of distributing reprogramming software from a software rewriting device such as a diagnostic device by wired communication (for example, PTL 1). As another method of reprogramming, there is a method of distributing reprogramming software by wireless communication called over-the-air (OTA) (for example, PTL 2).

CITATION LIST

Patent Literature

PTL 1: JP 11-96082 A
PTL 2: JP 2004-326689 A

SUMMARY OF INVENTION

Technical Problem

In reprogramming by OTA, the timing of rewriting a program is restricted by the configuration of a memory bank of a storage device provided in a microcomputer. The configuration of the memory bank is separated into a dual bank and a single bank. In a microcomputer including a dual-bank storage device (also referred to as a "dual-bank microcomputer" below), an operation surface and a rewriting surface of a program are independent from each other. As a result, the dual-bank microcomputer can perform reprogramming while providing a control function of the vehicle even during traveling (when an ignition switch is in an on state). On the other hand, in a microcomputer including a single-bank storage device (also referred to as a "single-bank microcomputer" below), the operation surface and the rewriting surface of the program are the same as each other. As a result, it is difficult for the single-bank microcomputer to perform reprogramming while providing the control function of the vehicle during traveling.

Therefore, in the single-bank microcomputer, it is necessary to perform reprogramming during parking (when the ignition switch is in an off state) in which it is not required to provide the control function of the vehicle. That is, when reprogramming is performed during parking or the like, it is not possible to travel (shift the ignition switch to the on state) until the reprogramming is completed. Thus, the down time of a user occurs.

In recent years, as technological innovation progresses in the technical field such as CASE (Connected, Autonomous/Automated, Shared, Electric), the program size of software is increasing due to advancement of functions required for the ECU. Thus, the time required for reprogramming inevitably tends to be increased. In addition, in order to enhance security, software is encrypted or electronically signed in order to ensure confidentiality and integrity of the software. Therefore, in the ECU, encryption processing such as decryption and verification of an electronic signature is required at the time of reprogramming, and the time required for reprogramming tends to be further increased. For this reason, in the ECU including the single-bank microcomputer, there is the restriction as described above, and thus the down time of the user becomes longer. Such a problem similarly occurs in a control device other than the ECU.

The present invention has been made in view of the above circumstances, and an object of the present invention is to shorten a time required for reprogramming of a control device including a single-bank microcomputer.

Solution to Problem

In order to solve the above problem, according to the present invention, a control device includes a first arithmetic processing device that executes a program stored in a predetermined area in which a memory bank is configured as a single bank, and a second arithmetic processing device. The second arithmetic processing device includes a preprocessing unit that performs preprocessing on a rewriting program in reprogramming processing of rewriting the program stored in the predetermined area into the rewriting program, and a transmission unit that transmits the preprocessed rewriting program to the first arithmetic processing device. The first arithmetic processing device includes a reception unit that receives the rewriting program transmitted from the second arithmetic processing device, and a writing unit that writes the received rewriting program in the predetermined area.

Advantageous Effects of Invention

According to the present invention, it is possible to shorten a time required for reprogramming of a control device including a single-bank microcomputer.

Objects, configurations, and advantageous effects other than those described above will be clarified by the descriptions of the following embodiments.

BRIEF DESCRIPTION OF DRAWINGS

FIG. 4 is a diagram for explaining the reprogramming processing illustrated in FIG. 3.

FIG. 6 is a diagram for explaining a process of determining a second ECU that performs reprogramming processing in cooperation with a first ECU.

DESCRIPTION OF EMBODIMENTS

Hereinafter, embodiments of the present invention will be described with reference to the drawings. Components denoted by the same reference signs in the respective embodiments have similar functions in the respective embodiments unless otherwise specified, and the description thereof will be omitted.

Embodiment 1

In the present embodiment, an ECU 901 that is a device that is mounted in a vehicle and controls a vehicle will be described as an example of a control device that includes a single-bank microcomputer and performs reprogramming processing. However, the control device in the present invention may be a device that is mounted on a machine or a device other than a vehicle and controls the machine or the device other than the vehicle. The ECU 901 is an example of a "control device" described in the claims.

In the present embodiment, the reprogramming processing is processing of rewriting software including a program for realizing the functions of the control device into new software. In the present embodiment, new software rewritten by the reprogramming processing is also referred to as "rewriting software 221". The rewriting software 221 includes a plurality of "rewriting programs 5" which are new programs for realizing the functions of the control device.

Figure 1:
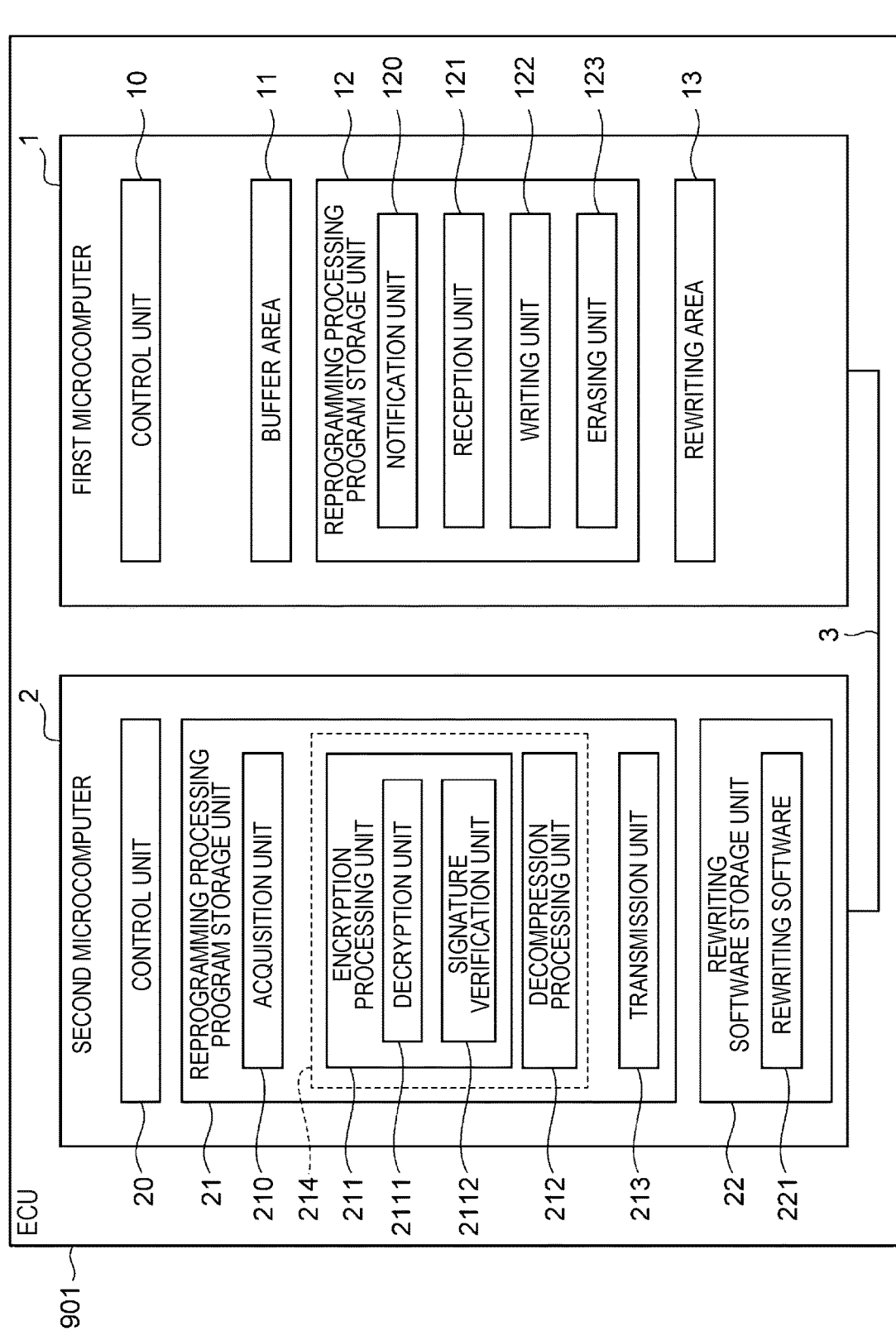
FIG. 1 is a block diagram illustrating a functional configuration of an ECU according to Embodiment 1.

FIG. 1 is a block diagram illustrating a functional configuration of the ECU 901 according to Embodiment 1.

The ECU 901 includes a first microcomputer 1 and a second microcomputer 2. The first microcomputer 1 is an example of a "first arithmetic processing device" described in the claims. The second microcomputer 2 is an example of a "second arithmetic processing device" described in the claims.

The first microcomputer 1 and the second microcomputer 2 are connected to each other by a communication bus 3. The communication bus 3 is used for data communication by a notification unit 120, a reception unit 121, and a transmission unit 213 described later. The communication standard of the communication bus 3 may be SPI, MII, CAN, Ethernet, or the like, and is not particularly limited.

The first microcomputer 1 executes a program stored in a predetermined area (a rewriting area 13 to be described later) in which a memory bank is configured as a single bank. This program is a program for realizing the function of the ECU 901. The first microcomputer 1 includes a single-bank microcomputer.

The first microcomputer 1 performs reprogramming processing when shifting to a stop state in which execution of the program is stopped. Specifically, the first microcomputer 1 performs the reprogramming processing when the ECU 901 shifts to a stop state of stopping a control operation. For example, the first microcomputer 1 performs the reprogramming processing when the ECU 901 shifts to the stop state by an ignition switch of the vehicle shifting to an off state. A plurality of the first microcomputers 1 may be provided in the ECU 901.

The first microcomputer 1 includes a control unit 10, a buffer area 11, a reprogramming processing program storage unit 12, and a rewriting area 13.

The control unit 10 includes a processor such as a CPU, an MPU, or a DSP, and executes a program stored in the reprogramming processing program storage unit 12 or a program stored in the rewriting area 13. As a result, the control unit 10 performs processing related to the first microcomputer 1 for realizing a reprogramming function or the function of the ECU 901.

The buffer area 11 is a buffer area for temporarily storing the rewriting program 5 received by the reception unit 121 before the rewriting program 5 is written in the rewriting area 13. From the viewpoint of the number of times of performing writing to the buffer area 11 and a writing speed, the buffer area 11 is preferably configured by a volatile storage device such as a DRAM or an SRAM. However, the buffer area 11 may be configured by a non-volatile storage device such as an EEPROM, a flash memory, or an SSD.

The reprogramming processing program storage unit 12 (also referred to as a "program storage unit 12" below) stores a program (also referred to as a "reprogramming processing program" below) executed by the control unit 10 in order to realize the reprogramming function of the ECU 901. The program storage unit 12 may be configured by a non-volatile storage device such as an EEPROM, a flash memory, or an SSD.

The program storage unit 12 stores the notification unit 120, the reception unit 121, a writing unit 122, and an erasing unit 123 as a reprogramming processing program.

The notification unit 120 notifies the second microcomputer 2 of a start request of the reprogramming processing. The notification unit 120 may notify the second microcomputer 2 of the start request of the reprogramming processing when the ECU 901 shifts to the stop state. In addition, the notification unit 120 may determine the necessity of the reprogramming processing when the ECU 901 shifts to the stop state, and notify the second microcomputer 2 of the start request of the reprogramming processing based on the determination result. The notification unit 120 may determine the necessity of the reprogramming processing based on whether or not the ECU 901 is notified, from an external device, of information indicating that the reprogramming processing is required. Alternatively, the notification unit 120 may determine the necessity of the reprogramming processing based on whether or not downloading of the rewriting software 221 distributed from the external device by OTA or the like is completed and the rewriting software 221 is stored in a rewriting software storage unit 22. Further, the notification unit 120 notifies the second microcomputer 2 of a transmission permission of the rewriting program 5 in accordance with the availability of the buffer area 11.

The reception unit 121 receives the rewriting program 5 transmitted from the second microcomputer 2 via the communication bus 3. The reception unit 121 temporarily stores the received rewriting program 5 in the buffer area 11.

The writing unit 122 reads the rewriting program 5 stored in the buffer area 11 and writes the rewriting program 5 in the rewriting area 13. That is, the writing unit 122 writes the rewriting program 5 received by the reception unit 121 in the rewriting area 13. When the writing to the rewriting area 13 is completed, the writing unit 122 erases the rewriting program 5 as a writing target from the buffer area 11. As a result, the reception unit 121 can receive a new rewriting program 5 and store the received new rewriting program 5 in the buffer area 11.

The erasing unit 123 erases the program stored in the rewriting area 13 after the notification unit 120 performs the notification of the start request of the reprogramming processing. When there is a free space in the rewriting area 13 due to erasing of the program by the erasing unit 123, the writing unit 122 can write the rewriting program 5 stored in the buffer area 11 in the rewriting area 13 and can erase the rewriting program 5 from the buffer area 11.

The rewriting area 13 is an area for storing a program for realizing the function of the ECU 901. Examples of the program for realizing the function of the ECU 901 include a program for realizing a control function of the vehicle and a boot program for starting the first microcomputer 1. The rewriting area 13 may be configured by a non-volatile storage device such as an EEPROM, a flash memory, or an SSD.

The second microcomputer 2 has more resources than the first microcomputer 1. The second microcomputer 2 may be a microcomputer having resources that become available when the ECU 901 shifts to the stop state. Specifically, the second microcomputer 2 may be a microcomputer in which, when the ignition switch shifts to the off state in a certain driving cycle, the resources become available enough for processing of performing reprogramming on the first microcomputer 1. For example, the second microcomputer 2 may be configured by a dual-bank microcomputer that does not need to perform reprogramming on the second microcomputer 2 when the ignition switch shifts to the off state. This is because the dual-bank microcomputer can perform reprogramming even when the ignition switch is in an on state. Alternatively, the second microcomputer 2 may be configured by a single-bank microcomputer that is not an OTA reprogramming target. A plurality of the second microcomputers 2 may be provided in the ECU 901.

Note that the driving cycle may be a period from a state in which the ignition switch shifts to the on state and a power source such as an engine starts (excluding a start following an automatic stop of the engine in an idling stop compliant vehicle) to a state in which the ignition switch shifts to the off state and the power source stops (excluding an automatic stop of the engine in the idling stop compliant vehicle).

The second microcomputer 2 includes a control unit 20, a reprogramming processing program storage unit 21, and a rewriting software storage unit 22.

The control unit 20 includes a processor such as a CPU, an MPU, or a DSP, and executes a program stored in the reprogramming processing program storage unit 21 or a program (not illustrated) for realizing the function of the ECU 901 related to the second microcomputer 2. As a result, the control unit 20 performs processing related to the second microcomputer 2 for realizing a reprogramming function or the function of the ECU 901.

The reprogramming processing program storage unit 21 (also referred to as a "program storage unit 21" below) stores a program (also referred to as a "reprogramming processing program" below) executed by the control unit 20 in order to realize the reprogramming function of the ECU 901. The program storage unit 21 may be configured by a non-volatile storage device such as an EEPROM, a flash memory, or an SSD.

The program storage unit 21 stores an acquisition unit 210, an encryption processing unit 211, and an decompression processing unit 212 as a reprogramming processing program.

The acquisition unit 210 acquires the rewriting software 221 (rewriting program 5) stored in the rewriting software storage unit 22 when the notification of the start request of the reprogramming processing is received from the notification unit 120 of the first microcomputer 1.

The encryption processing unit 211 executes an encryption process on the rewriting software 221 (rewriting program 5) acquired by the acquisition unit 210. The encryption processing unit 211 is not configured as the reprogramming processing program included in the program storage unit 21, but may be configured by an HSM, SHE, TPM having tamper resistance, or another secure microcomputer (also referred to as a secure core). The encryption processing unit 211 includes a secure microcomputer or the like having tamper resistance, and thus it is possible to prevent falsification of the program. Thus, it is possible to enhance security of the ECU 901 related to the reprogramming processing.

The encryption processing unit 211 includes a decryption unit 2111 and a signature verification unit 2112. The decryption unit 2111 decrypts the rewriting software 221 (rewriting program 5) previously encrypted, by using a predetermined encryption algorithm. Key information of a common key or a secret key used for decryption may be stored in advance in a non-volatile storage device such as the program storage unit 21, or may be stored in advance in a storage device having tamper resistance. The signature verification unit 2112 verifies the electronic signature added in advance to the rewriting software 221 (rewriting program 5) by a predetermined encryption algorithm. By verifying the electronic signature, the integrity of the rewriting software 221 (rewriting program 5) is verified. Key information of a public key or the common key used for signature verification may be stored in advance in a non-volatile storage device such as the program storage unit 21, or may be stored in advance in a storage device having tamper resistance.

The decompression processing unit 212 executes a decompression process on the rewriting software 221 (rewriting program 5) acquired by the acquisition unit 210. That is, the decompression processing unit 212 decompresses the rewriting software 221 (rewriting program 5) compressed in advance. The decompression processing unit 212 may be configured by a hardware accelerator provided in the second microcomputer 2 instead of being configured as the reprogramming processing program included in the program storage unit 21.

In the present embodiment, the encryption process (signature verification and decryption) of the encryption processing unit 211 and the decompression process of the decompression processing unit 212, which are performed on the rewriting software 221 (rewriting program 5), are also referred to as an "encryption and decompression process". The encryption and decompression process is an example of a "preprocess" that is a process executed on the rewriting software 221 (rewriting program 5) before the program stored in the rewriting area 13 of the first microcomputer 1 is rewritten into the rewriting software 221 (rewriting program 5) in the reprogramming processing. In the present embodiment, the encryption processing unit 211 and the decompression processing unit 212 are also referred to as a "preprocessing unit 214".

The transmission unit 213 transmits the rewriting program 5 subjected to the encryption and decompression process by the encryption processing unit 211 and the decompression processing unit 212 to the first microcomputer 1 via the communication bus 3. Specifically, when the notification of the transmission permission of the rewriting program 5 is received from the notification unit 120 of the first microcomputer 1, the transmission unit 213 transmits the rewriting program 5 subjected to encryption and decompression process by the encryption processing unit 211 and the decompression processing unit 212 to the first microcomputer 1. That is, when the notification of the transmission permission of the rewriting program 5 is received from the first microcomputer 1, the transmission unit 213 transmits the rewriting program 5 preprocessed by the preprocessing unit 214 to the first microcomputer 1.

The rewriting software storage unit 22 stores the rewriting software 221 including the rewriting program 5 for rewriting the program stored in the rewriting area 13 of the first microcomputer 1. The rewriting software storage unit 22 may be configured by a non-volatile storage device provided in the second microcomputer 2. The rewriting software storage unit 22 may be configured by a non-volatile storage device externally attached to the ECU 901, such as an external flash. When the rewriting software storage unit 22 is an externally-attached storage device, data communication between the rewriting software storage unit 22 and the second microcomputer 2 may be performed by using the communication standard such as SPI.

When the ignition switch is in the on state, that is, before the ECU 901 shifts to the stop state, the second microcomputer 2 may receive the rewriting software 221 by downloading the rewriting software 221 distributed from the external device by OTA or the like and store the received rewriting software 221 in the rewriting software storage unit 22. Alternatively, the second microcomputer 2 may receive the rewriting software 221 from another ECU connected to the ECU 901 via a communication network such as CAN or Ethernet, and store the received rewriting software in the rewriting software storage unit 22. A method by which the second microcomputer 2 receives the rewriting software 221 is not particularly limited.

Figure 2:
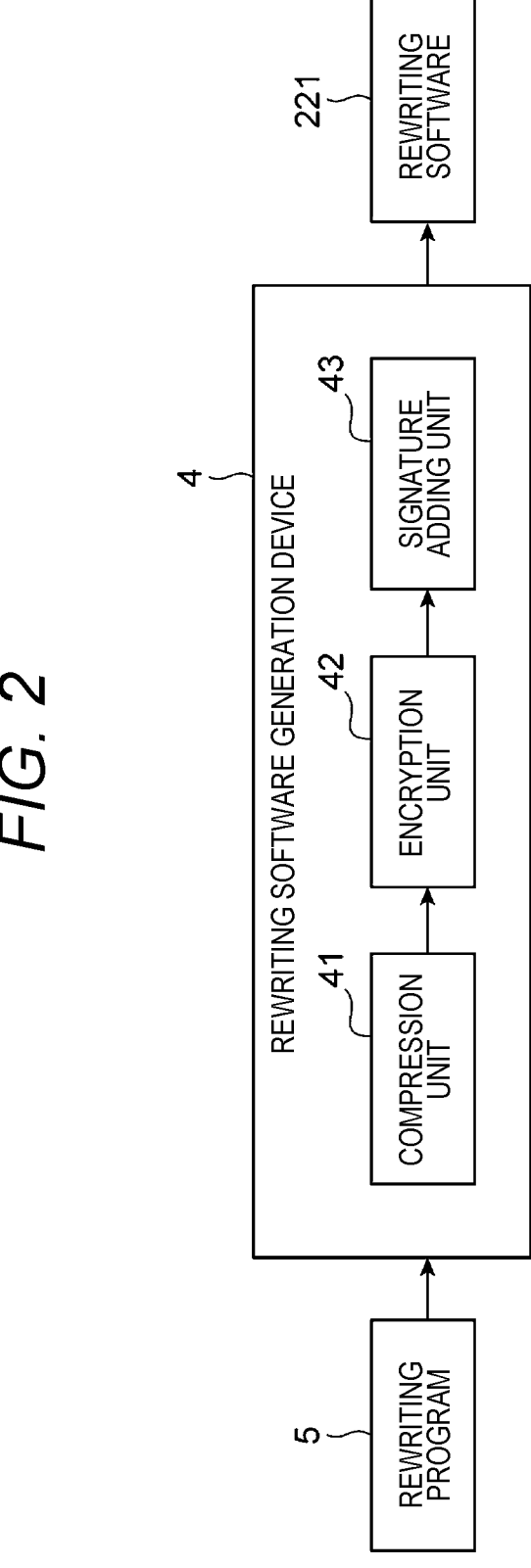
FIG. 2 is a diagram illustrating a process of generating rewriting software illustrated in FIG. 1.

FIG. 2 is a diagram illustrating a process of generating the rewriting software 221 illustrated in FIG. 1. Note that the arrows illustrated in FIG. 2 indicate conceptual flows of commands or data, and do not limit a communication direction or an instruction direction. In addition, there may be a flow of commands or data not illustrated by arrows. The same applies to FIG. 3 and the subsequent drawings.

The rewriting program 5 is expressed as an object code or an execution file in which source codes created by a certain programming language are converted by software such as a compiler or an interpreter.

A rewriting software generation device 4 is software that receives one or a plurality of rewriting programs 5 as an input and outputs the rewriting software 221 based on a predetermined format. The rewriting software generation device 4 includes a compression unit 41, an encryption unit 42, and a signature adding unit 43 that respectively compress, encrypt, and add a signature to the rewriting program 5 by a predetermined algorithm.

The execution order of the processes of the compression unit 41, the encryption unit 42, and the signature adding unit 43 can be freely set in accordance with the format of the rewriting software 221. When the rewriting software 221 is generated in accordance with the example of the execution order of the processes illustrated in FIG. 2, in the reprogramming processing in the second microcomputer 2, the processes of signature verification, decryption, and decompression are executed in the reverse order (signature verification→decryption→decompression) to that of the rewriting software generation device 4.

Note that, in the rewriting software generation device 4, not all of the compression unit 41, the encryption unit 42, and the signature adding unit 43 are essential. Furthermore, depending on the format of the rewriting software 221, the rewriting software generation device 4 can execute the processes of compression, encryption, and signature addition for each any size of the rewriting program 5. At this time, for example, when the rewriting software generation device 4 adds two electronic signatures to the rewriting program 5, signature verification is performed twice corresponding to two signature additions in the reprogramming processing in the second microcomputer 2.

Figure 3:
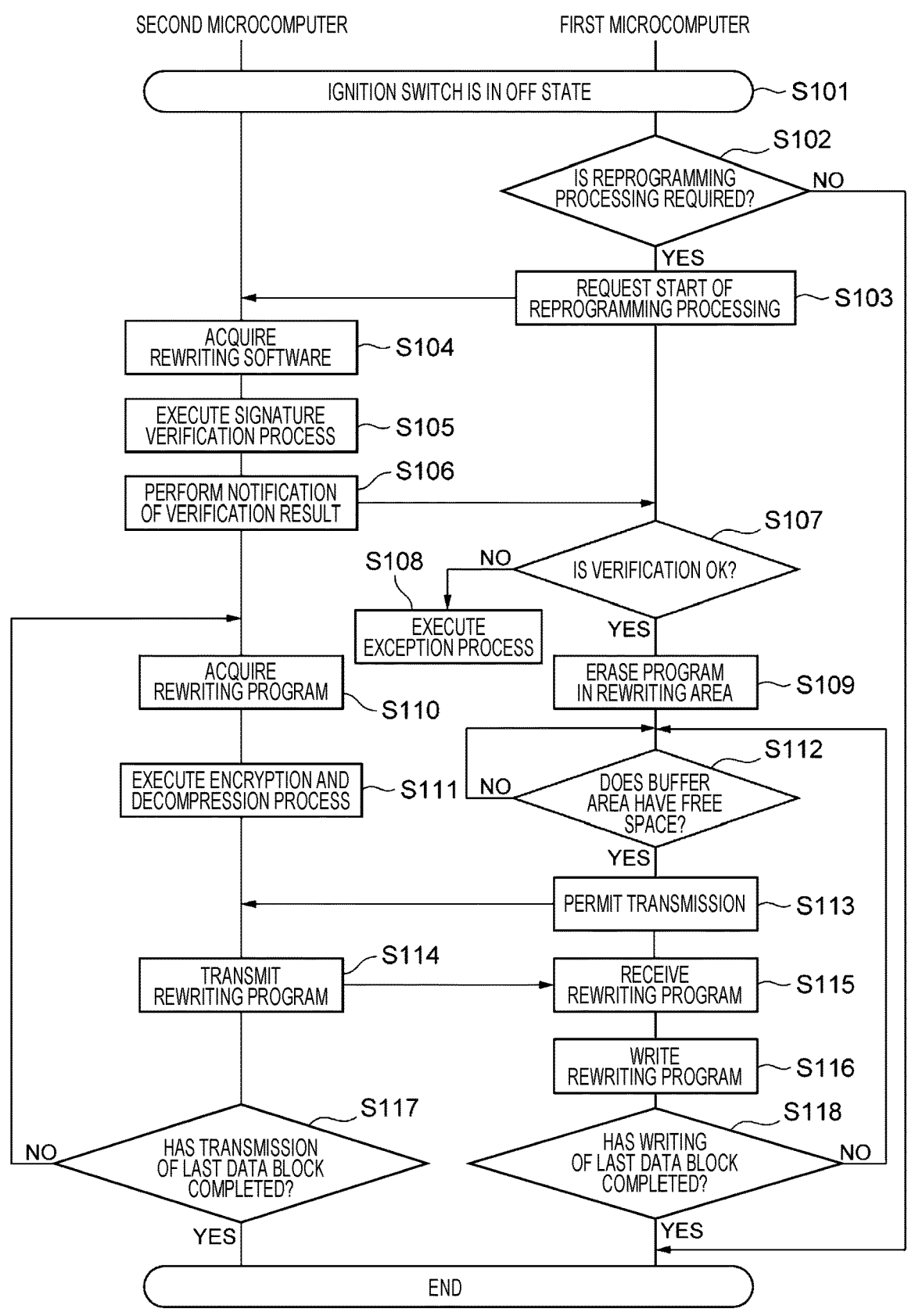
FIG. 3 is a sequence diagram of reprogramming processing performed in the ECU illustrated in FIG. 1.

FIG. 3 is a sequence diagram of the reprogramming processing performed in the ECU 901 illustrated in FIG. 1.

The reprogramming processing illustrated in FIG. 3 is started when the ignition switch shifts to the off state (Step S101).

The first microcomputer 1 determines the necessity of reprogramming processing (Step S102). For example, when the rewriting software 221 is not stored in the rewriting software storage unit 22 (NO in Step S102), the first microcomputer 1 determines that the reprogramming processing is unnecessary. Then, the first microcomputer 1 ends the reprogramming processing. On the other hand, when the rewriting software 221 is stored in the rewriting software storage unit 22 (YES in Step S102), the first microcomputer 1 determines that the reprogramming processing is necessary. Then, the first microcomputer 1 notifies the second microcomputer 2 of a start request of the reprogramming processing (Step S103).

When the notification of the start request of the reprogramming processing is received from the first microcomputer 1, the second microcomputer 2 acquires the rewriting software 221 stored in the rewriting software storage unit 22 (Step S104). Then, the second microcomputer 2 verifies an electronic signature added to the acquired rewriting software 221 (Step S105), and notifies the first microcomputer 1 of the verification result (Step S106).

When the notification of the verification result of the electronic signature is received from the second microcomputer 2, the first microcomputer 1 determines whether the verification result indicates verification success (Step S107). When the verification result indicates verification failure (NO in Step S107), the first microcomputer 1 executes a predetermined exception process (Step S108). As this exception process, for example, the reprogramming processing in and after Step S109 may be suspended, and the ECU 901 may be shifted to a power shutdown state. On the other hand, when the verification result indicates the verification success (YES in Step S107), the first microcomputer 1 starts erasing the program stored in the rewriting area 13 (Step S109).

In parallel with Step S109, the second microcomputer 2 acquires the rewriting program 5 from the rewriting software 221 stored in the rewriting software storage unit 22 in units of predetermined data blocks (Step S110). Then, the second microcomputer 2 executes an encryption and decompression process on the acquired rewriting program 5 (Step S111) to decrypt and decompress the rewriting program 5. The second microcomputer 2 executes the encryption and decompression process in parallel with the erasing of the program by the first microcomputer 1 (Step S109), so that the ECU 901 can shorten the time required for reprogramming.

After Step S109, the first microcomputer 1 determines whether the buffer area 11 has a free space enough to store the rewriting program 5 (Step S112). When there is no free space in the buffer area 11 (NO in Step S112), the first microcomputer 1 polls whether or not there is a free space in the buffer area 11 every predetermined period. On the other hand, when there is a free space in the buffer area 11 (YES in Step S112), the first microcomputer 1 notifies the second microcomputer 2 of a transmission permission of the rewriting program 5 (Step S113). That is, the first microcomputer 1 notifies the second microcomputer 2 of a transmission permission of the rewriting program 5 in accordance with the availability of the buffer area 11.

When the first microcomputer 1 notifies the second microcomputer 2 of the transmission permission of the rewriting program 5, the second microcomputer 2 transmits the rewriting program 5 to the first microcomputer 1 in units of predetermined data blocks (Step S114). The first microcomputer 1 receives the rewriting program 5 transmitted from the second microcomputer 2 (Step S115), and stores the received rewriting program 5 in the buffer area 11. Then, the first microcomputer 1 reads the rewriting program 5 stored in the buffer area 11 in units of predetermined data blocks, and writes the rewriting program 5 in the rewriting area 13 (Step S116). Here, the rewriting program 5 stored in the buffer area 11 is erased by the first microcomputer 1 until a new rewriting program 5 is received after completion of writing to the rewriting area 13.

After Step S114, the second microcomputer 2 determines whether or not the transmission of the rewriting program 5 to the first microcomputer 1 has been completed up to the last data block constituting the rewriting software 221 (Step S117). That is, the second microcomputer 2 determines whether or not all the rewriting programs 5 have been transmitted to the first microcomputer 1. When the transmission of the rewriting program 5 has not been completed up to the last data block (NO in Step S117), the second microcomputer 2 proceeds to Step S110. On the other hand, when the transmission of the rewriting program 5 has been completed up to the last data block (YES in Step S117), the second microcomputer 2 ends the reprogramming processing related to the second microcomputer 2.

After Step S116, the first microcomputer 1 determines whether or not writing of the rewriting program 5 to the rewriting area 13 has been completed up to the last data block constituting the rewriting software 221 (Step S118). That is, the first microcomputer 1 determines whether or not all the rewriting programs 5 have been written in the rewriting area 13. When the writing of the rewriting program 5 has not been completed up to the last data block (NO in Step S118), the first microcomputer 1 proceeds to Step S112. On the other hand, when the writing of the rewriting program 5 has been completed up to the last data block (YES in Step S118), the second microcomputer 2 ends the reprogramming processing related to the first microcomputer 1.

When the writing and the transmission of the rewriting program 5 have been completed up to the last data block, the first microcomputer 1 and the second microcomputer 2 determine that the reprogramming processing has been completed. Then, the first microcomputer 1 and the second microcomputer 2 may shift the ECU 901 to the power shutdown state.

Note that the second microcomputer 2 may acquire a new rewriting program 5 and perform the encryption and decompression process in advance during a period from when the encryption and decompression process is executed until the notification of the transmission permission of the rewriting program 5 is received from the first microcomputer 1 (between Step S111 and Step S113).

Figure 4:
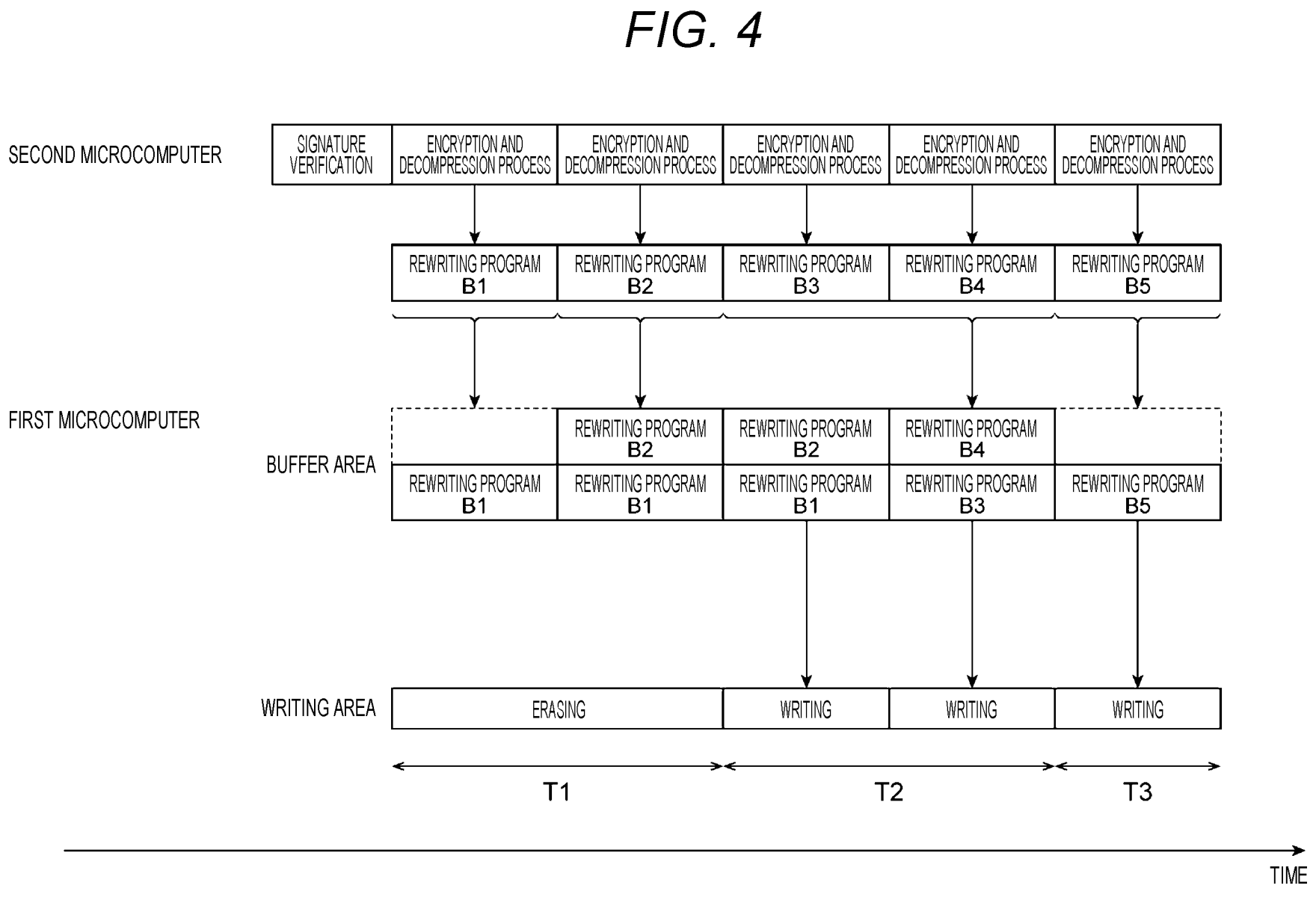

FIG. 4 is a diagram for explaining the reprogramming processing illustrated in FIG. 3. Note that, in FIG. 4, the right direction of the paper surface indicates the positive direction of the time axis.

In FIG. 4, the second microcomputer 2 verifies the electronic signature added to the rewriting software 221, and a period T1 is started after it is confirmed that the signature verification is successful in the first microcomputer 1.

In the period T1, the first microcomputer 1 erases the program stored in the rewriting area 13. In parallel with this, the second microcomputer 2 executes the encryption and decompression process of the rewriting program 5. In addition, the second microcomputer 2 can transmit the rewriting program 5 to the first microcomputer 1 in units of predetermined data blocks in accordance with the availability of the buffer area 11. During erasing of the program stored in the rewriting area 13, the first microcomputer 1 cannot write the rewriting program 5 in the rewriting area 13. Thus, the rewriting program 5 (B1, B2) can remain stored in the buffer area 11.

In a period T2, the first microcomputer 1 writes the rewriting program 5 (B1, B2) stored in the buffer area 11 in the period T1 to the rewriting area 13. When this writing is completed, the first microcomputer 1 erases the rewriting program 5 (B1, B2) stored in the buffer area 11. Until the buffer area 11 has a free space, the second microcomputer 2 can execute the encryption and decompression process of the rewriting program 5 in advance. The first microcomputer 1 notifies the second microcomputer 2 of the transmission permission of the rewriting program 5 at a timing when the buffer area 11 becomes vacant. Then, the second microcomputer 2 can transmit, to the first microcomputer 1, the rewriting program 5 (B3, B4) that has been previously subjected to the encryption and decompression process. The first microcomputer 1 can collectively write the rewriting program 5 (B3, B4) in the rewriting area 13.

Even in and after a period T3, the basic processing procedures of the first microcomputer 1 and the second microcomputer 2 are similar to those in the periods T1 and T2. That is, the second microcomputer 2 executes the encryption and decompression process in advance, and transmits the rewriting program 5 to the first microcomputer 1 by the free space of the buffer area 11 that has occurred. The first microcomputer 1 writes the rewriting program 5 stored in the buffer area 11 in the rewriting area 13, and erases the rewriting program 5 stored in the buffer area 11 when the writing has completed.

As described above, the ECU 901 according to Embodiment 1 is a control device including a first microcomputer 1 and a second microcomputer 2 that execute a program stored in a rewriting area 13 in which a memory bank is configured as a single bank. The second microcomputer 2 includes the preprocessing unit 214 that performs preprocessing such as the encryption and decompression process on the reprogramming program 5 in the reprogramming processing, and the transmission unit 213 that transmits the preprocessed rewriting program 5 to the first microcomputer 1. The first microcomputer 1 includes a reception unit 121 that receives the rewriting program 5 transmitted from the second microcomputer 2, and a writing unit 122 that writes the received rewriting program 5 in the rewriting area 13.

With such a configuration, the ECU 901 in Embodiment 1 can perform preprocessing to be performed on the rewriting program 5 before rewriting the program of the first microcomputer 1 to the rewriting program 5 not by the first microcomputer 1 but by the second microcomputer 2. That is, in the ECU 901 in Embodiment 1, the first microcomputer 1 and the second microcomputer 2 cooperate to perform reprogramming processing, so that the program of the first microcomputer 1 can be rewritten to the rewriting program 5. As a result, the ECU 901 in Embodiment 1 can shorten the processing time of the reprogramming processing related to the first microcomputer 1 with limited resources as compared with the second microcomputer 2. Therefore, the ECU 901 in Embodiment 1 can shorten the time required for reprogramming by the OTA of the control device including the single-bank microcomputer.

The first microcomputer 1 in Embodiment 1 further includes the notification unit 120 that notifies the second microcomputer 2 of the start request of the reprogramming process, and the erasing unit 123 that erases the program stored in the rewriting area 13 after the notification unit 120 performs the notification of the start request. The second microcomputer 2 in Embodiment 1 further includes the acquisition unit 210 that acquires the rewriting program 5 when the notification of the start request of the reprogramming processing is received from the first microcomputer 1. The preprocessing unit 214 of the second microcomputer 2 performs preprocessing on the rewriting program 5 acquired by the acquisition unit 210.

With such a configuration, the second microcomputer 2 in Embodiment 1 can perform preprocessing on a new rewriting program 5 in advance during erasing of the program in the rewriting area 13 in which the first microcomputer 1 cannot write the rewriting program 5. As a result, in the ECU 901 in Embodiment 1, when the program in the rewriting area 13 is erased by effectively utilizing the resources of the second microcomputer 2, the first microcomputer 1 can immediately write the rewriting program 5 in the rewriting area 13. Therefore, the ECU 901 in Embodiment 1 can efficiently perform the reprogramming processing related to the first microcomputer 1, and can further shorten the processing time. Thus, the ECU 901 in Embodiment 1 can further shorten the time required for reprogramming by the OTA of the control device including the single-bank microcomputer.

The first microcomputer 1 in Embodiment 1 further includes the buffer area 11 for temporarily storing the received rewriting program 5 before writing the received rewriting program 5 in the rewriting area 13. The notification unit 120 of the first microcomputer 1 notifies the second microcomputer 2 of the transmission permission of the rewriting program 5 in accordance with the availability of the buffer area 11. When the notification of the transmission permission is received from the first microcomputer 1, the transmission unit 213 of the second microcomputer 2 transmits the preprocessed rewriting program 5 to the first microcomputer 1.

With such a configuration, the second microcomputer 2 in Embodiment 1 can transmit the preprocessed rewriting program 5 to the first microcomputer 1 even when the first microcomputer 1 is writing the rewriting program 5 in the rewriting area 13 or erasing the program from the rewriting area 13. As a result, in the ECU 901 in Embodiment 1, the first microcomputer 1 can immediately write the rewriting program 5 in the rewriting area 13 at a timing when the rewriting program 5 can be written in the rewriting area 13. Therefore, the ECU 901 in Embodiment 1 can efficiently perform the reprogramming processing related to the first microcomputer 1, and can further shorten the processing time. Thus, the ECU 901 in Embodiment 1 can further shorten the time required for reprogramming by the OTA of the control device including the single-bank microcomputer.

In addition, the notification unit 120 of the first microcomputer 1 in Embodiment 1 determines the necessity of the reprogramming processing when the ECU 901 shifts to the stop state, and notifies the second microcomputer 2 of the start request of the reprogramming processing based on the determination result.

With such a configuration, the ECU 901 in Embodiment 1 can suppress the reprogramming processing from being performed at a time when it is not appropriate to perform the reprogramming processing. Therefore, the ECU 901 in Embodiment 1 can efficiently perform reprogramming by the OTA of the control device including the single-bank microcomputer.

The preprocessing unit 214 of the second microcomputer 2 in Embodiment 1 further includes the encryption processing unit 211 including the signature verification unit 2112 and the decryption unit 2111, and the decompression processing unit 212.

With such a configuration, the ECU 901 in Embodiment 1 can shorten the processing time of the reprogramming processing related to the first microcomputer 1 while securing confidentiality, integrity, and the like of the rewriting program 5 and suppressing the data communication time of the rewriting program 5. Therefore, the ECU 901 in Embodiment 1 can shorten the time required for reprogramming by the OTA of the control device including the single-bank microcomputer, and can enhance the security related to the reprogramming.

Further, the ECU 901 in Embodiment 1 is a device that is mounted in a vehicle and controls the vehicle. The notification unit 120 of the first microcomputer 1 notifies the second microcomputer 2 of the start request of the reprogramming processing when the ECU 901 shifts to the stop state as the ignition switch of the vehicle shifts to the off state.

With such a configuration, the ECU 901 of Embodiment 1 can perform the reprogramming processing at an appropriate time when it is not necessary to provide the control function of the vehicle. Therefore, the ECU 901 in Embodiment 1 can efficiently perform the reprogramming processing by the OTA.

Embodiment 2

A control system 991 according to Embodiment 2 will be described with reference to FIGS. 5 and 6. In the control system 991 in Embodiment 2, the description of the similar configuration and operation as those in Embodiment 1 will be omitted.

Figure 5:
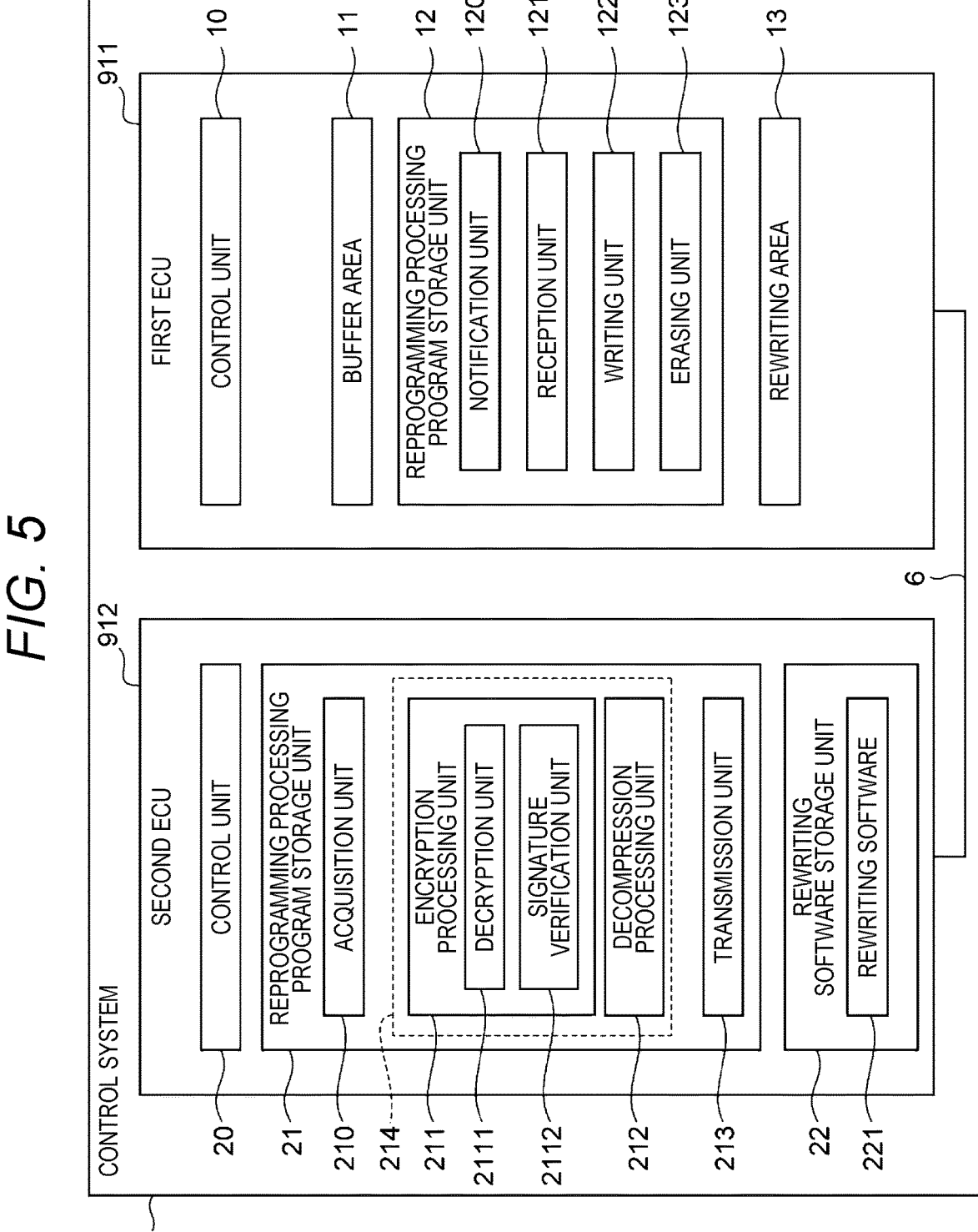
FIG. 5 is a block diagram illustrating a functional configuration of a control system according to Embodiment 2.

FIG. 5 is a block diagram illustrating a functional configuration of the control system 991 according to Embodiment 2.

The reprogramming processing of Embodiment 1 is completed inside the ECU 901. On the other hand, reprogramming processing in Embodiment 2 is processing performed in the control system 991 including a plurality of ECUs, and is processing performed across the plurality of ECUs.

Specifically, the control system 991 includes a first ECU 911 that executes a program stored in a predetermined area (rewriting area 13) in which a memory bank is configured as a single bank, and a second ECU 912. The first ECU 911 is an example of a "first control device" described in the claims. The second ECU 912 is an example of a "second control device" described in the claims. The control system 991 is an example of a "control system" described in the claims.

The first ECU 911 is an ECU including a single-bank microcomputer. The second ECU 912 has more resources than the first ECU 911. The second ECU 912 may be, for example, an ECU configured to include a dual-bank microcomputer or an ECU configured to include a single-bank microcomputer that is not an OTA reprogramming target.

The second ECU 912 preprocesses the rewriting program 5 in the reprogramming processing of rewriting a program stored in a predetermined area (rewriting area 13) of the first ECU 911 to the rewriting program 5. The second ECU 912 transmits the preprocessed rewriting program 5 to the first ECU 911. The first ECU 911 receives the rewriting program 5 transmitted from the second ECU 912. The first ECU 911 writes the received rewriting program 5 in the predetermined area (rewriting area 13).

With such a configuration, the control system 991 in Embodiment 2 can perform preprocessing to be performed on the rewriting program 5 before rewriting the program of the first ECU 911 to the rewriting program 5 not by the first ECU 911 but by the second ECU 912. That is, in the control system 991 in Embodiment 2, the first ECU 911 and the second ECU 912 cooperate to perform reprogramming processing, so that the program of the first ECU 911 can be rewritten to the rewriting program 5. As a result, the control system 991 in Embodiment 2 can shorten the processing time of the reprogramming processing related to the first ECU 911 with limited resources as compared with the second ECU 912. Therefore, the control system 991 in Embodiment 2 can shorten the time required for reprogramming by the OTA of the control device including the single-bank microcomputer.

As illustrated in FIG. 5, the configuration of the control system 991 related to the reprogramming processing is basically similar to the configuration of the ECU 901 related to the reprogramming processing illustrated in FIG. 1. However, in the control system 991, when the notification unit 120 of the first ECU 911 notifies the second ECU 912 of the start request of the reprogramming process, it is conceivable to use a method as illustrated in FIG. 6. The first ECU 911 and the second ECU 912 are connected to each other via a communication network 6 such as CAN or Ethernet.

Figure 6:
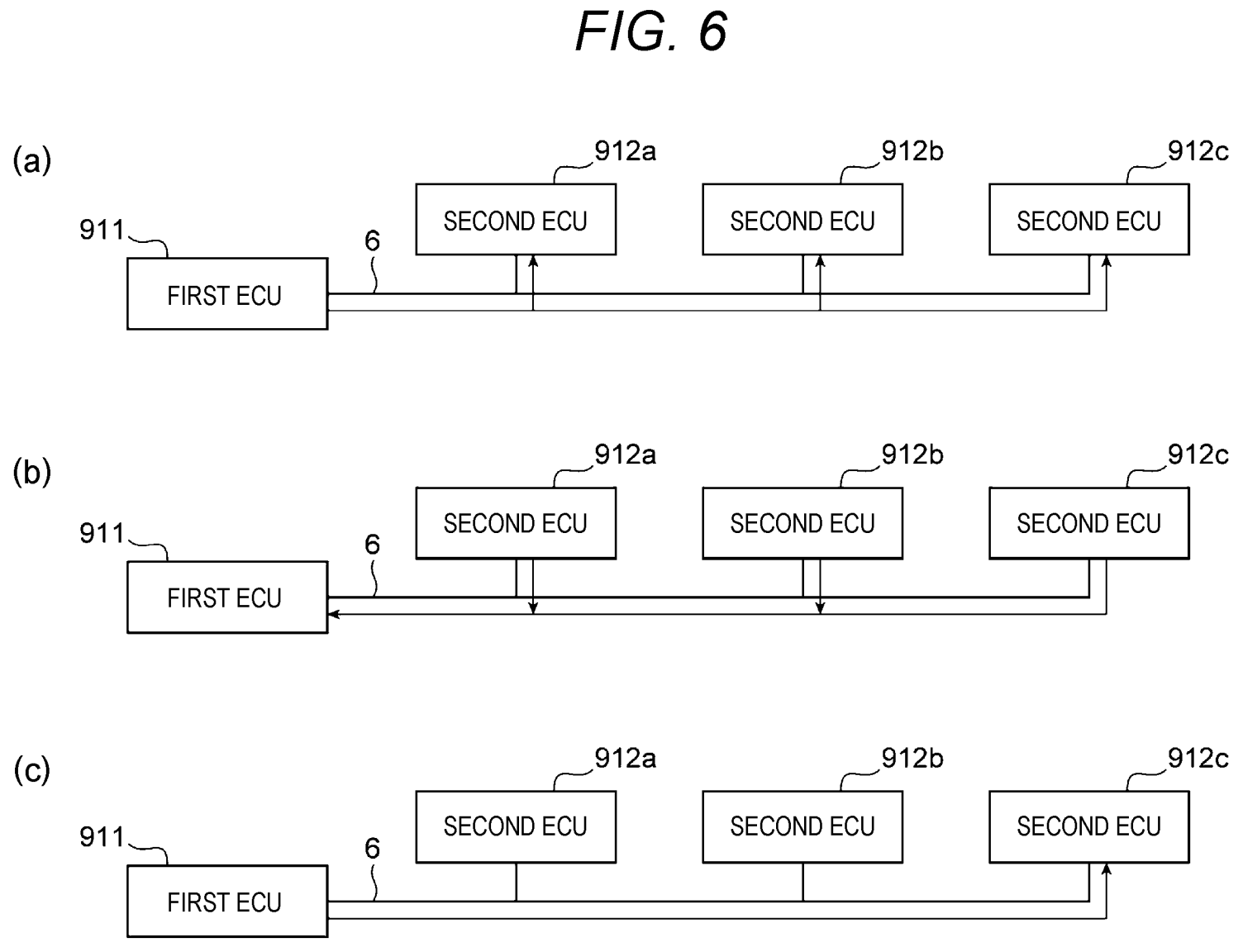

FIG. 6 is a diagram for explaining a process of determining the second ECU 912 that performs the reprogramming processing in cooperation with the first ECU 911. FIG. 6(a) is a diagram for explaining a first stage of the process of determining the second ECU 912 that performs the reprogramming processing in cooperation with the first ECU 911. FIG. 6(b) is a diagram for explaining a second stage of the process of determining the second ECU 912 that performs the reprogramming processing in cooperation with the first ECU 911. FIG. 6(c) is a diagram for explaining a third stage of the process of determining the second ECU 912 that performs the reprogramming processing in cooperation with the first ECU 911.

In the example illustrated in FIG. 6, the second ECU 912 includes a plurality of second ECUs 912a to 912c. Each of the plurality of second ECUs 912a to 912c is connected to the first ECU 911 via the communication network 6. In the example illustrated in FIG. 6, the second ECU 912 that performs the reprogramming processing in cooperation with the first ECU 911 is determined by performing the three-stage handshake of FIGS. 6(a) to 6(c) between the first ECU 911 and the plurality of second ECUs 912a to 912c.

As the first stage illustrated in FIG. 6(a), the first ECU 911 transmits a query inquiring whether or not the reprogramming processing is performed to the plurality of second ECUs 912a to 912c for each driving cycle. The first ECU 911 may store a table in which a destination to which the query is to be transmitted is predetermined, and transmit the query to the specific second ECU 912 by referring to the table (for example, unicast method). Alternatively, the first ECU 911 may transmit the query to an unspecified number of second ECUs 912 by a broadcast method. FIG. 6(a) illustrates an example in which the first ECU 911 transmits the query to each of the plurality of second ECUs 912a to 912c.

As the second stage illustrated in FIG. 6(b), the plurality of second ECUs 912a to 912c transmits a response to the query of FIG. 6(a) to the first ECU 911. Among the plurality of second ECUs 912a to 912c, only the second ECU 912 capable of performing the reprogramming processing may transmit the response to the first ECU 911. Alternatively, all the second ECUs 912 that have received the query among the plurality of second ECUs 912a to 912c may transmit the response to the first ECU 911. FIG. 6(b) illustrates an example in which each of the plurality of second ECUs 912a to 912c that have received the query transmits a response to the first ECU 911.

As the third stage illustrated in FIG. 6(c), the first ECU 911 transmits a start request of the reprogramming processing based on the response illustrated in FIG. 6(b). When receiving responses from the plurality of second ECUs 912a to 912c, the first ECU 911 determines the second ECU 912 that cooperatively performs the reprogramming processing among the plurality of second ECUs 912a to 912c that have received the responses. In this case, the first ECU 911 may store a priority table in which the priority of the second ECU 912 to be determined is determined in advance, and determine the second ECU 912 that cooperatively performs the reprogramming processing by referring to the priority table. This priority may be determined in advance based on, for example, the processing speed and the like of each of the plurality of second ECUs 912a to 912c at the time of performing the reprogramming processing. FIG. 6(c) illustrates an example in which the first ECU 911 determines the second ECU 912c as the second ECU 912 that cooperatively performs the reprogramming processing.

Note that, in the process of determining the second ECU 912 that performs the reprogramming processing in cooperation with the first ECU 911, each of the plurality of second ECUs 912a to 912c may voluntarily transmit whether or not the reprogramming processing is performed, to the first ECU 911 for each driving cycle. In this case, the first ECU 911 does not need to transmit a query as illustrated in FIG. 6(a) to the plurality of second ECUs 912a to 912c.

As described above, even when the second ECU 912 includes the plurality of second ECUs 912a to 912c, the control system 991 can appropriately determine the second ECU 912 that performs the reprogramming processing in cooperation with the first ECU 911. As a result, in the control system 991, even when the second ECU 912 is configured by the plurality of second ECUs 912a to 912c, the first ECU 911 and the second ECU 912 can perform the reprogramming processing in cooperation with each other. Therefore, even when the second ECU 912 includes the plurality of second ECUs 912a to 912c, the control system 991 can shorten the time required for reprogramming by the OTA of the control device including the single-bank microcomputer.

Others

The present invention is not limited to the above embodiments, and various modification examples may be provided. For example, the above embodiments have been described in detail in order to explain the present invention in an easy-to-understand manner, and the above embodiments are not necessarily limited to a case including all the described configurations. Further, some components in one embodiment can be replaced with the components in another embodiment, and the configuration of another embodiment can be added to the configuration of one embodiment. Regarding some components in the embodiments, other components can be added, deleted, and replaced.

Some or all of the configurations, functions, processing units, processing means, and the like may be realized by hardware by being designed with an integrated circuit, for example. Further, the above-described respective components, functions, and the like may be realized by software by the processor interpreting and executing a program for realizing the respective functions. Information such as a program, a tape, and a file, that realizes each function can be stored in a memory, a recording device such as a hard disk and a solid state drive (SSD), or a recording medium such as an IC card, an SD card, and a DVD.

Control lines and information lines considered necessary for the descriptions are illustrated, and not all the control lines and the information lines in the product are necessarily shown. In practice, it may be considered that almost all components are connected to each other.

REFERENCE SIGNS LIST 1 first microcomputer (first arithmetic processing device)
11 buffer area
120 notification unit
121 reception unit
122 writing unit
123 erasing unit
13 rewriting area (predetermined area)
2 second microcomputer (second arithmetic processing device)
210 acquisition unit
211 encryption processing unit
2111 decryption unit
2112 signature verification unit
212 decompression processing unit
213 transmission unit
214 preprocessing unit
5 rewriting program
901 ECU (control device)
911 first ECU (first control device)
912 second ECU (second control device)
991 control system

The invention claimed is:

1. A control device comprising:
a first arithmetic processing device that executes a program stored in a predetermined area in which a memory bank is configured as a single bank, wherein the first arithmetic processing device includes
an erasing unit that erases the program stored in the predetermined area; and
a second arithmetic processing device, wherein the second arithmetic processing device includes
a preprocessing unit that performs preprocessing on a rewriting program in reprogramming processing of rewriting the program stored in the predetermined area into the rewriting program in parallel with the first arithmetic processing device erasing the program, and
a transmission unit that transmits the preprocessed rewriting program to the first arithmetic processing device, and
the first arithmetic processing device includes
a reception unit that receives the rewriting program transmitted from the second arithmetic processing device, and
a writing unit that writes the received rewriting program in the predetermined area.

2. The control device according to claim 1, wherein the first arithmetic processing device further includes
a notification unit that notifies the second arithmetic processing device of a start request of the reprogramming processing, and
the erasing unit erases the program stored in the predetermined area after the notification unit performs a notification of the start request,
the second arithmetic processing device further includes
an acquisition unit that acquires the rewriting program when the notification of the start request is received from the first arithmetic processing device, and
the preprocessing unit performs the preprocessing on the rewriting program acquired by the acquisition unit.

3. The control device according to claim 2, wherein
the first arithmetic processing device includes a buffer area in which the received rewriting program is temporarily stored before being written in the predetermined area,
the notification unit notifies the second arithmetic processing device of a transmission permission of the rewriting program in accordance with availability of the buffer area, and
when a notification of the transmission permission is received from the first arithmetic processing device, the transmission unit transmits the preprocessed rewriting program to the first arithmetic processing device.

4. The control device according to claim 2, wherein the notification unit
determines necessity of the reprogramming processing when the control device shifts to a stop state of stopping a control operation, and
notifies the second arithmetic processing device of the start request based on a determination result.

5. The control device according to claim 2, wherein the preprocessing unit includes
an encryption processing unit including a signature verification unit that verifies an electronic signature added to the rewriting program in advance and a decryption unit that decrypts the rewriting program encrypted in advance, and
a decompression processing unit that decompresses the rewriting program compressed in advance.

6. The control device according to claim 2, wherein
the control device is mounted in a vehicle and controls the vehicle, and
the notification unit notifies the second arithmetic processing device of the start request when the control device shifts to a stop state of stopping a control operation by an ignition switch of the vehicle shifting to an off state.

7. A control system comprising:
a first control device that executes a program stored in a predetermined area in which a memory bank is configured as a single bank, wherein the first control device
erases the program stored in the predetermined area; and
a second control device, wherein the second control device
performs preprocessing on a rewriting program for rewriting the program stored in the predetermined area into the rewriting program in parallel with the first control device erasing the program, and
transmits the preprocessed rewriting program to the first control device, and
the first control device
receives the rewriting program transmitted from the second control device, and
writes the received rewriting program in the predetermined area.

* * * * *